US011355156B2

(12) United States Patent
Madduluri (10) Patent No.: US 11,355,156 B2
(45) Date of Patent: Jun. 7, 2022

(54) SYSTEMS AND METHODS FOR PRODUCING ANNOTATED CLASS DISCUSSION VIDEOS INCLUDING RESPONSIVE POST-PRODUCTION CONTENT

(71) Applicant: SLING MEDIA L.L.C., Foster City, CA (US)

(72) Inventor: Ramgopal Madduluri, Foster City, CA (US)

(73) Assignee: Sling Media L.L.C., Foster City, CA (US)

( * ) Notice: Subject to any disclaimer, the term of this patent is extended or adjusted under 35 U.S.C. 154(b) by 0 days.

(21) Appl. No.: 16/936,202

(22) Filed: Jul. 22, 2020

(65) Prior Publication Data
US 2020/0349979 A1 Nov. 5, 2020

Related U.S. Application Data

(63) Continuation of application No. 16/231,451, filed on Dec. 22, 2018, now Pat. No. 10,755,748.

(60) Provisional application No. 62/611,148, filed on Dec. 28, 2017.

(51) Int. Cl.
*G11B 27/036* (2006.01)
*G09B 5/06* (2006.01)
*G11B 27/19* (2006.01)
*H04N 5/272* (2006.01)

(52) U.S. Cl.
CPC ............ *G11B 27/036* (2013.01); *G09B 5/065* (2013.01); *G11B 27/19* (2013.01); *H04N 5/272* (2013.01)

(58) Field of Classification Search
CPC ...... G11B 27/036; G11B 27/19; G09B 5/065; H04N 5/272
See application file for complete search history.

(56) References Cited

U.S. PATENT DOCUMENTS

| 10,755,748 B2* | 8/2020 | Madduluri ............ G09B 5/065 |
| 2001/0020954 A1 | 9/2001 | Hull et al. |
| 2007/0100938 A1 | 5/2007 | Bagley et al. |
| 2008/0145830 A1 | 6/2008 | Huang et al. |
| 2009/0138906 A1 | 5/2009 | Eide et al. |

* cited by examiner

*Primary Examiner* — Girumsew Wendmagegn
(74) *Attorney, Agent, or Firm* — KW Law, LLP (57) ABSTRACT

Video production systems and methods are provided for generating annotated class discussion videos, which contain real-time student commentary post-production annotations responsive to such student commentary, or a combination thereof. In an embodiment, the video production system includes a display device, a dedicated video input source, and a video processing device. The video processing device contains, in turn, a wireless receiver configured to receive wireless input signals from the dedicated video input source and a plurality of devices executing a student commentary capture application during a presentation, a controller operably coupled to the wireless receiver, and a memory storing computer-readable instructions. When executed by the controller, the computer-readable instructions cause the video processing device to generate an output video containing student commentary synchronized with the presentation as captured, at least in part, utilizing the dedicated video input source. The output video is then presented on the display device.

20 Claims, 4 Drawing Sheets

SYSTEMS AND METHODS FOR PRODUCING ANNOTATED CLASS DISCUSSION VIDEOS INCLUDING RESPONSIVE POST-PRODUCTION CONTENT

CROSS-REFERENCE TO RELATED APPLICATIONS

This application is a continuation of the parent U.S. patent application Ser. No. 16/231,451 filed on Dec. 22, 2018, and claims priority to U.S. Provisional Patent Application Ser. No. 62/611,148, filed Dec. 28, 2017, the contents of both applications are hereby incorporated by reference.

TECHNICAL FIELD

The following generally relates to the production of digital video content, and, more particularly, to systems and methods for generating annotated class discussion videos, which contain real-time student commentary, post-production annotations responsive to student commentary, or a combination thereof.

BACKGROUND

In the United States and elsewhere, a large majority of adults now routinely carry smartphones capable of capturing and wirelessly disseminating high quality video. Leveraging this, video production systems have been recently introduced that serve as a central node for receiving, processing, and otherwise combining video input feeds from multiple smartphones or similar wireless devices having video capture capabilities. In so doing, such video production systems permit groups of relatively non-professional users equipped with smartphones or similar devices to work collaboratively in capturing multiple video feeds of an event, while one or more group members navigate between the video feeds to generate a desired output stream. The end result is a professional-style video production, which can be readily disseminated for viewing, sharing, publication, archiving, and other purposes. Such video production systems have been well-received by schools and other learning institutions for generating video content of community school functions, school sporting activities, and other school-related events utilizing any number of smartphones operated by students, faculty members, and possibly parents during events. The full potential of such video production systems remains unrealized, however, particularly as it relates to opportunities to further support student educational endeavors.

BRIEF SUMMARY

Video production systems and methods are provided for generating annotated class discussion videos, which contain real-time student commentary, post-production annotations responsive to such student commentary, or a combination thereof. Embodiments of the method are carried-out by a video production system including a video processing device and a display device. In an embodiment, the method includes the step or process of receiving, at the video processing device, at least a first video input stream from at least a first dedicated video input source of an educational presentation, such as a prerecorded lesson or live demonstration. Student commentary data is also received at the video processing device, as transmitted from a plurality of student-operated devices during the educational presentation. A preliminary or raw commentary-containing video of the educational presentation is generated by the video processing device, which contains student commentary derived from the student commentary data and synchronized to the appropriate timepoints at which such comments were submitted or captured during the presentation. Afterwards, the raw commentary-containing video is outputted to the display device for presentation thereon. In certain embodiments, the method further includes the steps or processes of: (i) after outputting the raw commentary-containing video, receiving explanatory content responsive to the synchronized student commentary contained in commentary-containing video; and (ii) utilizing the video processing device to further generate an annotated class discussion video of the educational presentation containing the explanatory content.

Embodiments of the method set-forth in the previous paragraph, may also include, in conjunction with receiving the first video input stream at the video processing device, concurrently receiving a second video input stream from a second dedicated video input source capturing the educational presentation. Selected portions of the first video input stream may then be combined with selected portions of the second video input stream when producing the raw commentary-containing video of the educational presentation. Similarly, in other implementations, the method may include the step or process of, in conjunction with receiving the first video input stream at the video processing device, concurrently receiving real-time sensor data pertaining to the material presented during the educational presentation. A visual representation of the real-time sensor data may then be incorporated into the raw commentary-containing video when producing the commentary-containing video of the educational presentation.

Further disclosed is a video processing device, which forms part of a video production system including a display device. In an embodiment, the video processing device includes a controller configured to receive a video input stream from a dedicated video input source during an educational presentation, a wireless receiver coupled to the controller and configured to relay student commentary data received from a plurality of student-operated devices during the educational presentation, and a memory storing computer-readable instructions. When executed by the controller, the computer-readable instructions cause the video production system to generate a raw commentary-containing video of the educational presentation, which contains student commentary derived from the student commentary data and synchronized to the appropriate timepoints at which such comments were submitted or captured during the presentation. The computer-readable instructions further cause the video production systems to present the raw commentary-containing video for viewing on the display device.

The foregoing methods and variants thereof can be implemented through software or program products bearing computer-readable instructions. Various additional examples, aspects, and other features of embodiments of the present disclosure are described in more detail below.

BRIEF DESCRIPTION OF THE DRAWING FIGURES

Exemplary embodiments will hereinafter be described in conjunction with the following drawing figures, wherein like numerals denote like elements, and.

DETAILED DESCRIPTION

The following detailed description of the invention is intended to provide various examples, but it is not intended to limit the invention or the application and uses of the invention. The term "exemplary," as appearing throughout this document, is synonymous with the term "example" and is utilized repeatedly below to emphasize that the following description provides only multiple non-limiting examples of the invention and should not be construed to restrict the scope of the invention, as set-out in the Claims, in any respect.

Video production systems and methods are provided for generating annotated class discussion videos, which contain real-time student commentary, post-production annotations responsive to student commentary, and combinations thereof. Embodiments of the video production system include a video processing device, which receives wireless input signals from multiple student-operated devices during a particular teaching lesson or educational presentation. The educational presentation can be, for example, a live demonstration performed by a professor, an instructor, or other faculty member. Alternatively, the presentation can be a prerecorded presentation, which is played for and collectively viewed by the student audience. The student-operated devices can be smartphones, laptop computers, tablet computers, wearable devices, and similar electronic devices having wireless communication capabilities. The student-operated devices execute a specialized program or software application for collecting student commentary during the educational presentation and submitting such commentary to the video processing device over, for example, a Wireless Local Area Network (WLAN).

In addition to the student commentary data, the video production system also receives at least one and possibly multiple dedicated video feeds, which visually capture or record the educational presentation from one or more angles. The dedicated video feeds can be, for example, video feeds captured by external cameras positioned at different locations around the educational presentation. In certain cases, the dedicated video feeds may also include a video feed capturing imagery not visible to an ordinary human observer, such as body imaging data, video in the infrared or ultraviolet spectrum, or video feed captured by an internal body (e.g., laparoscopic) camera. In the context of medical applications, imagery of data captured by one or more vital monitoring devices can also be utilized in embodiments of the present disclosure. For example, such data can be presented in real-time to students viewing a presentation (e.g., a teaching surgery) via a commentary-capture software application executing on the student-operated devices. Additionally or alternatively, such real-time sensor data can be incorporated into the annotated class discussion video, which may enhance awareness of vital readings in synchronization with the time position of the video. Similarly, if utilized in other educational contexts benefiting from machine read-outs or measurements of a demonstration, such machine read-outs (or graphics indicated of the read-outs) may be incorporated into the annotated discussion video, as desired.

The student commentary collected via the student-operated devices and reported to the video processing device during the educational presentation can assume various forms. Such student commentary can include information reflecting student understanding of the presented material, as usefully known to the individual or individuals administering the educational presentation or their superiors. In embodiments, the student commentary includes student queries regarding a particular point or topic that one or more students regarded as unclear or confusing. Similarly, the student commentary can include recommendations to further explain a particular portion of the presentation, to more clearly identify a particular object or feature shown in the dedicated video feed, or the like. The student commentary can be entered into the student-operated devices as text inputs, audio clips, or Graphical User Interface (GUI) touch or cursor input, to list but a few examples. The student-operated device then transmits this information as student commentary data in real-time or near real-time to the video processing device. The video processing device extracts the student commentary from the student commentary data, as it is received, and tags each student comment to a particular timepoint during the presentation. Afterwards, the video processing device generates a preliminary or raw commentary-containing video of the educational presentation as constructed from the dedicated video feeds and, perhaps, from additional video feeds captured by one or more of the student-operated devices. As indicated by the term "annotated," the raw commentary-containing video contains the synchronized student commentary; that is, the commentary submitted by the students and appearing within the raw commentary-containing video at the appropriate timepoints during the presentation.

The raw commentary-containing video is subsequently modified to include content responsive to the student commentary by a professor, a teacher's aid, another faculty member, a registered student, or other authorized personnel member (generically referred to herein as an "instructor"). Such responsive content is referred to herein as "post-production content" as this content is created after the raw commentary-containing video is initially produced. The post-production content may be explanatory in nature and may include text messages or annunciations displayed in conjunction with video of the educational presentation; audible replies to student queries; and/or the addition of graphics aiding in understanding when viewing the video content, such as motion graphics identifying particular objects shown in the video feed about which a student has inquired or has otherwise commented.

Other responsive post-production content can also be added to the annotated class discussion video, as desired, such as diagrams, pictures, or other imagery. Such post-production content can be combined or visually blended with the captured video of the presentation in various manners including by superimposing the post-production content over the video imagery or by presenting the post-production content in, for example, a Picture-in-Picture (PiP) format. The post-production content is thus combined with the raw commentary-containing video, which may remain in its original form or may be modified in some manner (e.g., by the removal or editing of selected student commentary) to yield an annotated class discussion video. The annotated class discussion video may then be published, disseminated, or otherwise made available to any number and type of desired individuals, such as the students originally attending the educational presentation and their classmates. In certain cases, the annotated class discussion video may be availed to a wider community of researchers, students, or other individuals located throughout the world for on-demand viewing.

Figure 1:
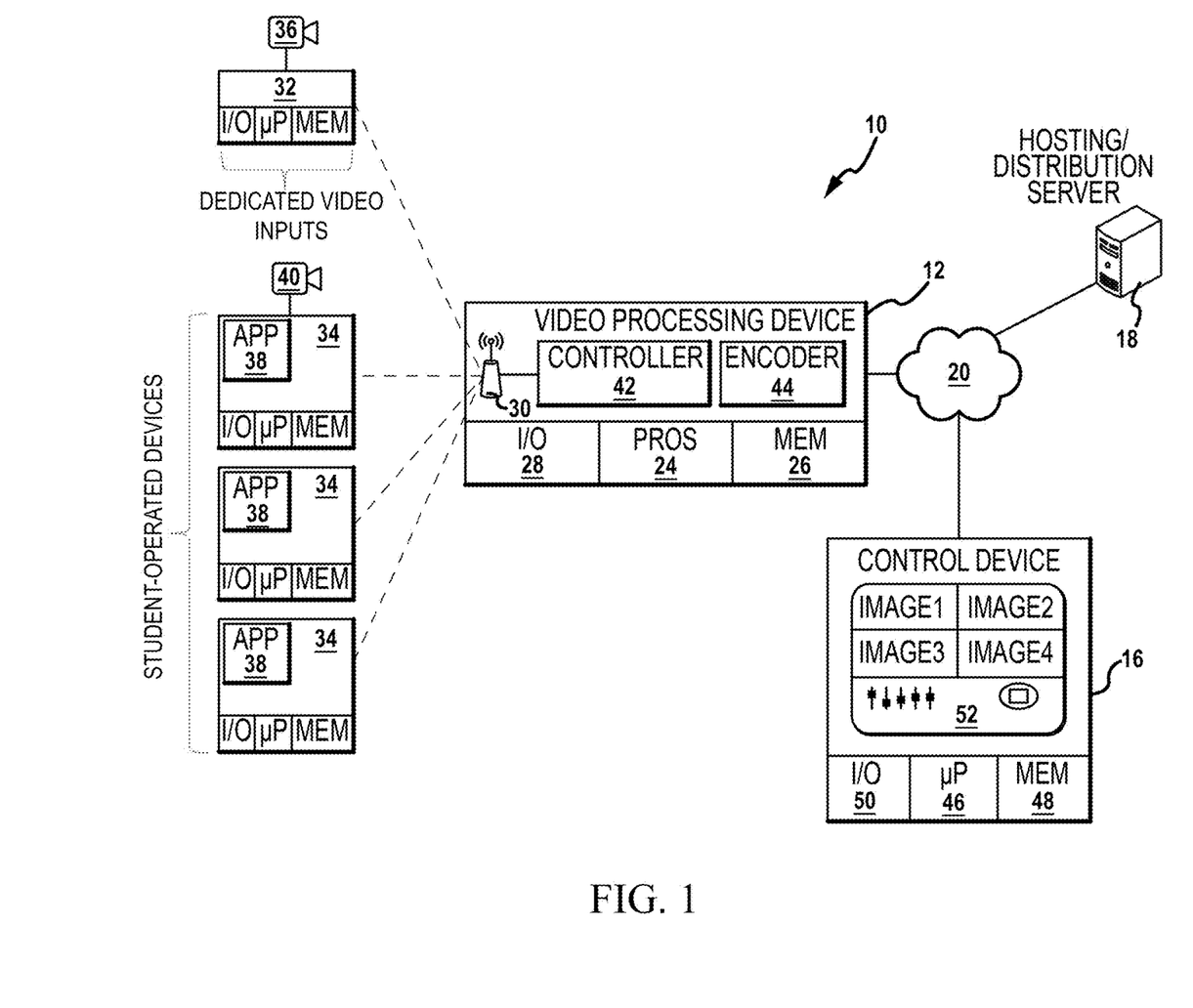
FIG. 1 is a diagram of a video production system suitable for carrying-out embodiments of the methods described herein, as illustrated in accordance with an exemplary embodiment of the present disclosure.

Turning now to the drawings and with initial reference to FIG. 1, a video production system 10 includes a video processing device 12, which is usefully implemented in accordance with the teachings of the present disclosure. Video production system 10 is utilized in the production of a digital video content and, specifically, to produce a raw commentary-containing video of the type described herein. As previously indicated and as discussed more fully below, the raw commentary-containing video may include imagery compiled from one or more video feeds captured during an educational presentation viewed by a student audience. Following generation of the raw commentary-containing video, video production system 10 may also be utilized to generate an annotated class discussion video by further processing the raw commentary-containing video to include post-production content responsive to the student commentary collected during the educational presentation.

Video production system 10 includes a video processing device 12, which may perform many of the processing tasks described herein. Video processing device 12 may be controlled at a user interface of video processing device 12, which is physically included in device 12. Additionally or alternatively, video processing device 12 may be controlled remotely utilizing at least one control device 16, which communicates with video processing device 12 over a communications network 20. During operation of video production system 10, video processing device 12 may be utilized to select and encode video content pursuant to instructions received from control device 16. The encoded video program may be initially stored as data files within an external storage device for eventual uploading to a hosting or distribution service 18 operating on communications network 20. As generically depicted in FIG. 1, network 20 may encompass the Internet, as well as WLANs, Wide Area Networks (WANs), cellular networks, and any other pubic or private networks. In certain implementations, the encoded video program may be directly streamed or otherwise transmitted to a social media platform for viewing by the public, friends, or various other groups of individuals.

Video processing device 12 contains processing hardware, such as a processor 24, a memory 26, and I/O features 28. I/O features 28 may include a suitable universal serial bus port or other interface to one or more external storage devices. While labeled simply as "memory 26" in FIG. 1, memory 26 generically represents all computer-readable storage areas of video processing device 12. Video processing device 12 contains computer-readable instructions and logic, which may be realized in any combination of hardware, firmware, and software generally. The computer-readable instructions, when executed by video processing device 12, support implementation of an AP 30 in accordance with pre-established standards, such as IEEE 802.11 or IEEE 802.14 standards. AP 30 may be implemented as a wireless receiver or transceiver included within or operatively supported by video processing device 12 in an embodiment. Other non-illustrated APs may also be present in the environment, possibly sharing the same channels as those utilized by AP 30.

During operation of video production system 10, video processing device 12 communicates through wireless AP 30 with any number of client devices 32, 34. As depicted in FIG. 1, client device 32 represents a dedicated video input source including a camera 36. Client device 32 may provide a video feed of the educational presentation to video processing device 12 over a wired or wireless connection. Although only a single client device 32 serving as a dedicated video feed is shown in FIG. 1 for clarity, it will be appreciated that video production system 10 can include any practical number of client devices 32 serving as dedicated video input feeds. For example, in embodiments, multiple client devices 32 having image capture capabilities may be positioned around an area in which the educational presentation occurs to provide a selection of viewpoints. Such client devices 32 can be spatially fixed or may be movable in some regard, such as by manual manipulation performed by a human operator, by remote control of motors or servos pointing or otherwise moving the device, by piloting a drone to which the client device is mounted, and utilizing other approaches.

In certain instances, one or more client devices 32 may be capable of capturing imagery that cannot be seen by an ordinary human observer. In some implementations, client devices 32 can include an imaging device for capturing imagery outside of the visible spectrum. For example, client devices 32 can include an infrared camera for capturing such as infrared, an ultraviolet camera for capturing ultraviolet imagery, or another camera for capturing electromagnetic energy outside of the visible spectrum. In the medical context, client devices 32 can also provide video feeds captured by Magnetic Resonance Imaging (MRI) machine, x-ray equipment, computerized tomography image equipment, Scanning Electron Microscope (SEM) devices, electrocardiogram (EKG) devices, and other devices, as well as miniaturized cameras inserted into a patient's body, as discussed more fully below in conjunction with FIGS. 3-4.

In addition to or in lieu of client device 32, video processing device 12 further communicates with a plurality of other client devices 34 via AP 30. Client devices 34 are operated by members of the student audience and are consequently referred to hereafter as "student-operated devices 34." Three such student-operated devices 34 are shown in FIG. 1; however, it will be appreciated that any practical number of devices 34 can be utilized. Student-operated devices 32 can include mobile phones, wearable devices, tablets, laptops, and similar devices capable of receiving student commentary inputs and providing such inputs to video processing device 12 via AP 30. Student-operated devices 32 may be loaded with and execute student commentary capture applications 38. Student-operated devices 32 may or may not have video capture capabilities; e.g., as indicated in FIG. 1 by symbol 40 for the uppermost one of devices 32. When having video capture capabilities, a student may utilize the appropriate device or devices 32 to record video of the educational presentation and transmit such video to device 12 for potential usage in interpreting the student commentary or in constructing a particular annotated class discussion video. In such embodiments, received video inputs may then be transmitted to video processing device 12 via WIFI®, BLUETOOTH®, or other wireless connection, as appropriate. Alternative embodiments of system 10 can facilitate communications with any other video capture devices in various other manners.

With continued reference to FIG. 1, video processing device 12 further contains a controller 42 and an encoder 44. Controller 42 and/or encoder 44 may be implemented as software logic stored in memory 26 and executed on processor 24. As a more specific example, controller 42 may be implemented as a control application executing on processor 24 including logic for implementing the various processes described herein. In other embodiments, the various functions and features may be implemented in hardware, software, firmware, or a combination thereof executing on other components, as desired. Encoder 44, for example, may be implemented using a dedicated video encoder chip in alternative implementations of video processing device 12. Regardless of the particular manner in which the components of device 12 are implemented, video processing device 12 operates in response to user input supplied by control device 16. Accordingly, control device 16 may correspond to any type of computing device containing at least one processor 46, memory 48, and I/O features 50. In various embodiments, control device 16 assumes the form of a tablet, laptop computer, a mobile phone, or other computing device capable of executing a software application 52 suitable for controlling the functions of system 10.

By way of generic example, software application 52 is depicted in FIG. 1 as including a GUI, which presents various video feeds received from client device(s) 32 and possibly student-operated devices 34. Software application 52 further supports user selection of various feeds to encode or otherwise incorporate desired video content into the finalized media product. Application 52 may include other displays to control other behaviors or functionalities of video processing device 12, as desired. Typically, control device 16 interacts with video processing device 12 via a wireless network, although wired connections could be equivalently employed. In operation, a student or other user acting as a video producer executes application 52 to enable viewing of the various video feeds available from one or more of client devices 32, 34. The selected video feed is received from client devices 32, 34 by video processing device 12. Video processing device 12 suitably compresses or otherwise encodes the selected video in an appropriate format for eventual viewing or distribution. Video encoding via encoder 44 occurs according to any standard, non-standard, or other protocol, such as MPEG4. One or more video inputs may then be composited to produce a final video, as discussed more fully below.

Figure 2:
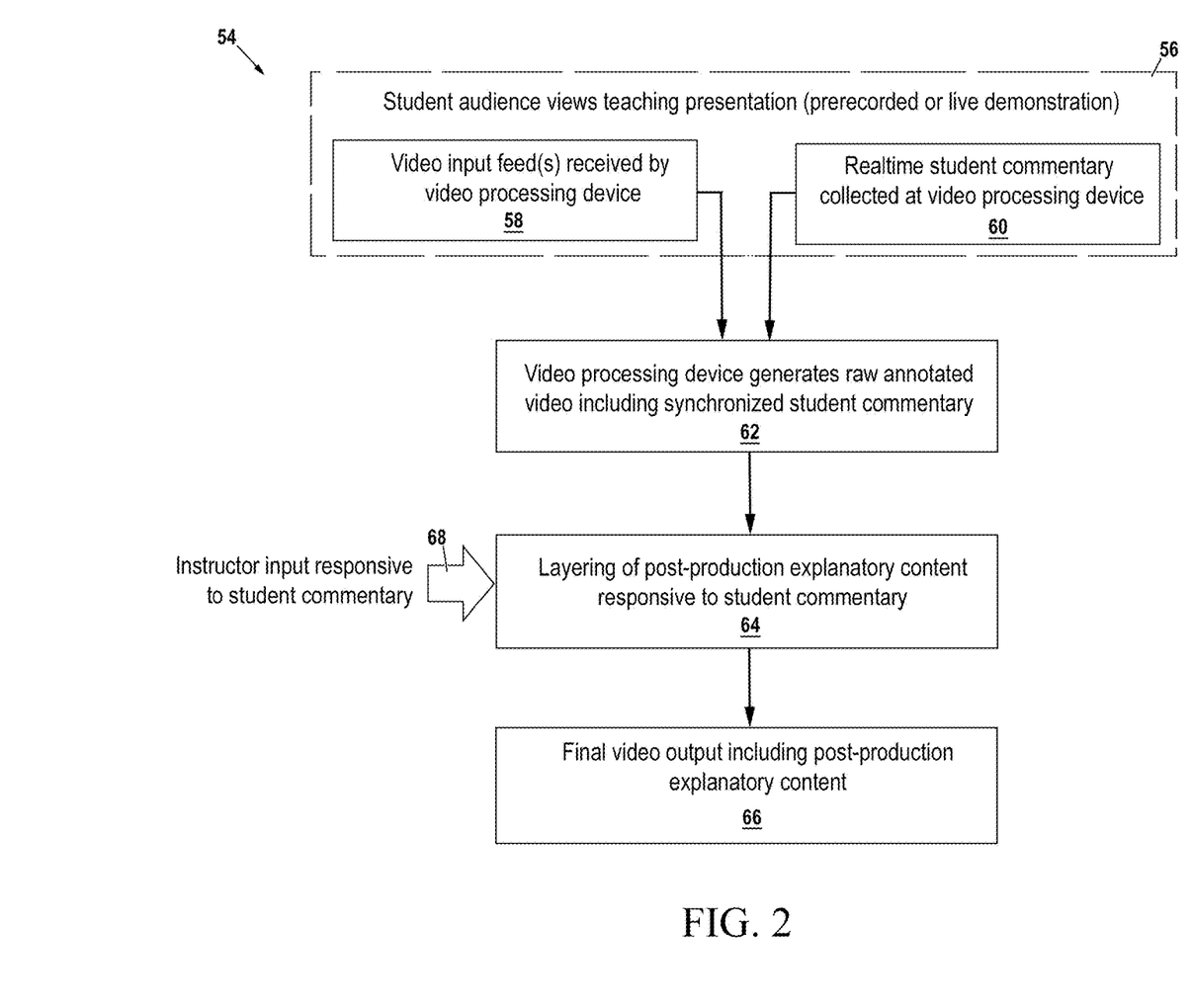
FIG. 2 is a flowchart setting-forth an exemplary method for generating annotated class discussion videos, which contain real-time student commentary and/or post-production annotations responsive to student commentary, as carried-out by the exemplary video production system shown in FIG. 1.

Referring now to FIG. 2, there is shown a flowchart of a method 54 for generating annotated class discussion videos, which contain real-time student commentary and/or post-production annotations responsive to student commentary. Method 54 is suitably carried-out utilizing video production system 10 shown in FIG. 1. Method 54 commences at PROCESS BLOCK 56 during which at least two processes are concurrently performed. At STEP 58, as the educational presentation progresses, one or more video input feeds of the educational presentation are captured (e.g., via client devices 32, 34 shown in FIG. 1) and transmitted to video processing device 12. At the same time, during the educational presentation, student commentary is collected utilizing student-operated devices 34 executing applications 38. Such student commentary can be initially stored on devices 34 and subsequently provided to video processing device 12 as a single transmission at a designated time, such as at the conclusion of the educational presentation. In other instances, student commentary is transmitted to video processing device 12 in real-time or near real-time as the commentary is entered into student-operated devices 34. In either scenario, the student commentary is tagged to appropriate timepoints in the educational presentation; that is, the timepoints at which each item of commentary was captured by one of devices 34 or submitted to device 12. For example, each item or instance of student commentary may be time-stamped with the current clock time, a Presentation Time Stamp (PTS), or another measurement enabling the student commentary to be synchronized to the video feed or feeds of the educational presentation. Such timestamps can be created by applications 38 executing on student-operated devices 34; or, in embodiments in which the student commentary is submitted in real-time to device 12, video processing device 12 may assign an appropriate timestamp to student comments upon receipt thereof.

During STEP 60, the student commentary is provided to video processing device 12 as one or more data transmissions generally referred to herein as "student commentary data." Student-operated devices 34 may transmit student commentary data at any number of appropriate junctures to AP 30 of video processing device 12 over a WLAN or other network utilizing, for example, WIFI® or BLUETOOTH® connections. The student commentary data can include various types of information pertaining to the educational information contained in the presentation and the student observers. For example, the student commentary data may contain information reflecting the students' comprehension, perception, or opinion of the material contained in the educational presentation. This advantageously permits virtually any number of students to submit questions, offer suggestions pertaining to the final video output of the educational presentation, or provide input indicating a lack of understanding at various junctures throughout the educational presentation without interruption of the presentation.

The student commentary data can be captured as text input, such typed messages or voice-to-text converted messages, entered into student-operated devices 34 executing student commentary capture application 38. Additionally or alternatively, the student commentary data can be captured as audio files of messages spoken by the students and recorded via microphones included in student-operated devices 34. As a still further possibility, embodiments of application 38 may enable a student to draw images onto a touchscreen of a given device 34 utilizing a finger, a stylus, or other implement. The images may be still or animated and, perhaps, superimposed over a captured frame of the educational presentation or a short video clip thereof. The images may then be submitted to video processing device 12 as student commentary data during STEP 60 of method 54. This latter functionality may be particularly useful when, for example, a live feed of the educational presentation is presented on devices 34 and a student can draw images superimposed over the live feed, such as an arrow, circle, or the like identifying an object appearing in the video feed to which the submitted student commentary pertains. In yet other implementations, a student may interact with virtual buttons or other widgets presented on a GUI of application 38 to convey useful information, such as a self-reported or surveyed understanding levels of the student at a given stage of the educational presentation.

After the educational presentation concludes, PROCESS BLOCK 56 (FIG. 2) terminates and method 54 advances to STEP 62. At STEP 62, video processing device 12 utilizes the student submission data received from student-operated devices 34 and the video input feeds provided by client devices 32 to generate a preliminary or raw commentary-containing video. In embodiments, the raw commentary-containing video may be generated utilizing the video feed output compiled from the video feeds and selected, as appropriate, utilizing control device 16. Video processing device 12 may superimpose or otherwise visually combine the student commentary with this video output. As noted above, the student commentary is synchronized to appear in the raw commentary-containing video at appropriate timepoints during the educational presentation at which the commentary was created or received by video processing device 12.

In certain embodiments, editing of student commentary may be permitted and carried-out utilizing control device 16. For example, written student comments containing misspellings or other grammatical errors may be corrected, redundant or similar student comments may be condensed into a single comment, inappropriate student comments may be deleted, and so on. The end result is raw commentary-containing video including synchronized student commentary, which can reviewed by an instructor to enhance the video through the addition of explanatory content, as discussed below in conjunction with STEP 64 of method 54 (FIG. 2). In alternative embodiments, STEP 62 can be performed concurrently with STEPS 58, 60 such that video processing device 12 combines student commentary with selected video feeds during the presentation (colloquially, "on the fly") and then outputs the raw commentary-containing video concurrent with or shortly after conclusion of the educational presentation.

Pursuant to STEP 62 of method 54, a finalized annotated class discussion video is created utilizing the raw commentary-containing video and adding post-production content responsive to the student commentary. As indicated in FIG. 2 by arrow 68, this may involve instructor review of the raw commentary-containing video and further input by the instructor (e.g., into video processing device 12 utilizing control device 16 or other user interface) of responsive content addressing the student commentary. For example, in a relatively simple embodiment, an instructor (e.g., a teacher, teacher's aid, a registered student, or other faculty member) may add textual replies or annunciation responding to student commentary, which then appear in the finalized annotated class discussion video. Such textual replies may be superimposed over imagery of the educational presentation or otherwise formatted for appearance on the same display screen as is the digital recording of the educational presentation; e.g., a sidebar or scrolling effect may be utilized to present the student commentary and the responsive post-production content.

In certain embodiments, other post-production content can be created and introduced into the finalized annotated class discussion video. For example, if student commentary indicates that a student is unfamiliar with or could not visually locate a particular object during the educational presentation (e.g., an anatomical feature during surgery or a particular mechanical component during a technical demonstration involving a complex machine), post-production content can be created to show an arrow, a highlighted circle, or similar imagery, whether static or dynamic, which visually identifies the ambiguous object for added clarity. As a further example, the video selections contained in the annotated raw video can be manipulated, as appropriate, to address student comments; e.g., if a student comment indicates that it is difficult for the student to visually discern a particular region of an item shown during the educational presentation, post-production content may added by further presenting the corresponding region of the imagery magnified by an appropriate zoom factor and presented as, for example, a PiP image. Various other types of post-production content can also be created and integrated into the annotated class discussion video. Further editing and possible removal or alteration of selected student commentary may also be conducted at this stage of method 54, providing that some form of post-production content is added to the annotated class discussion video responsive to the previously-collected student commentary.

Lastly, at STEP 66 of method 54, the annotated class discussion video is finalized and stored. The annotated class discussion video may also be disseminated in some manner. For example, the annotated class discussion video may be availed via an online portal or webpage to any desired group of individuals, such as the students originally attending the educational presentation and their classmates. In certain cases, the annotated class discussion video may be more widely availed to a larger community of researchers, students, or other individuals located anywhere throughout the world for on-demand viewing. Further collaborative editing may be permitted to allow the iterative creation of further versions of the annotated class discussion video, as may be supplemented by additional layering of post-production content created by other instructors or knowledgeable individuals within the larger viewing audience. This, in effect, may allow a collaboratively-edited, peer-to-peer or crowd-sourced evolution of the annotated class discussion video similar to the manner in which a community-edited online encyclopedia page (e.g., a WIKIPEDIA® page) is initially created and maintained with communal updates. Regardless of whether such additional, iterative modifications of the time-phase annotated class discussion video are permitted, the annotated class discussion video enables an instructor, such as a professor or administrator, to retroactively answer questions and provide additional points of clarity, while enabling such instructor replies to appear concomitantly with the student commentary upon viewing of the annotated class discussion video, if so desired. This, in turn, enhances the educational efficacy of the annotated class discussion video. Additionally, multiple students can concurrently submit separate queries or other comments during an educational presentation without interruption of the presentation and in instances in which it is difficult or impractical for the instructor to immediately answer such questions.

Figure 3:
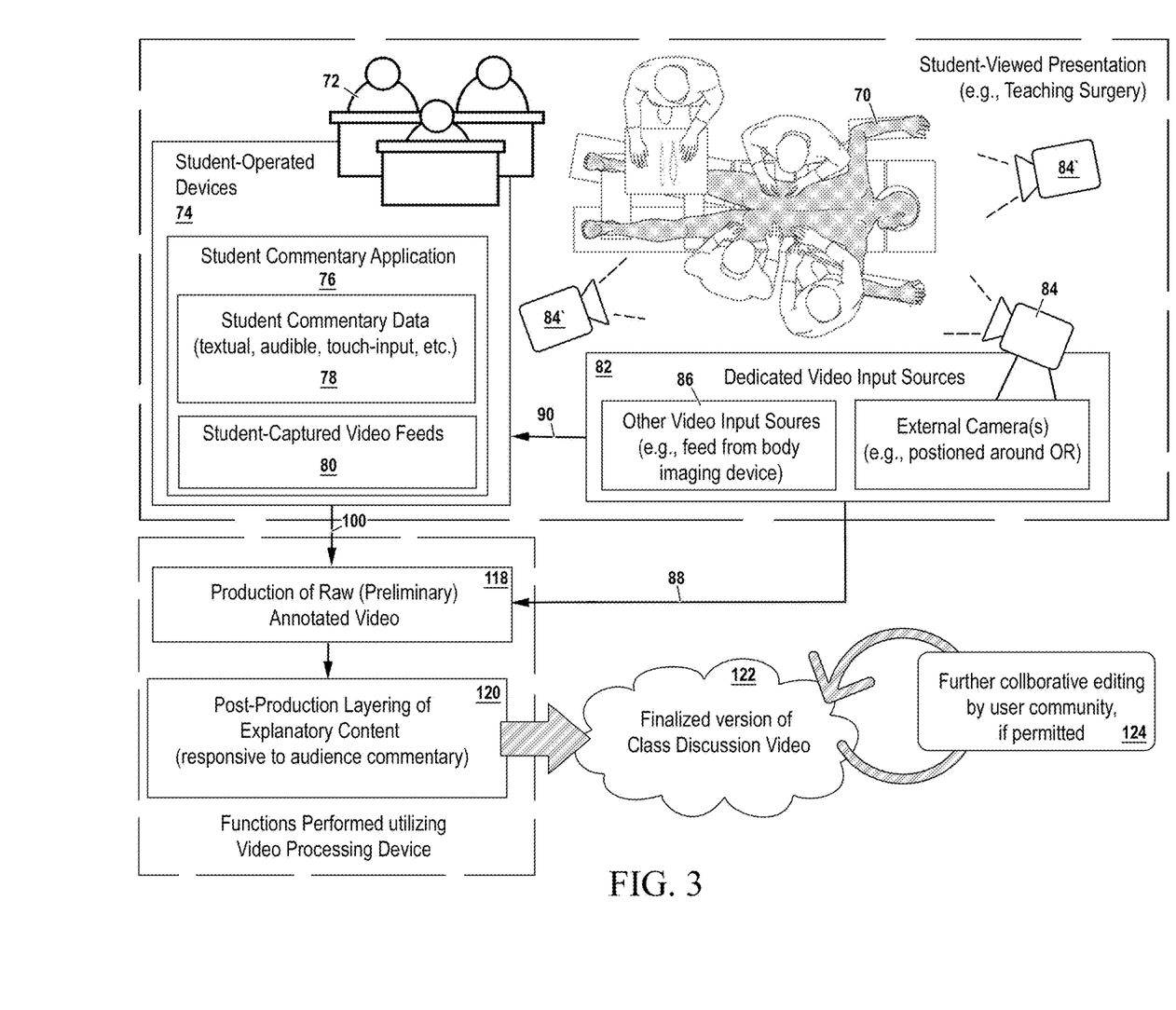
FIG. 3 schematically depicts one possible implementation of the method shown in FIG. 2 in which the video production system of FIG. 1 is utilized to generate an annotated class discussion video of a teaching surgery, as illustrated with an exemplary embodiment of the present disclosure.

Turning next to FIG. 3, a potential implementation of method 54 (shown in FIG. 2) is presented to provide a more specific, albeit non-limiting example of the applicability of the present disclosure. In this particular example, the educational presentation assumes the form of a teaching surgery performed on a patient 70. During this educational presentation, a group of medical students or surgical residents 72 view the teaching surgery from a galley, as generically depicted in the upper left corner of FIG. 3. Medical students 72 are in possession of a number of student-operated operated devices 74, with each student operating a particular device 74. Student-operated devices 74 can be supplied by the hospital in which the surgery is performed or an institution otherwise affiliated with the teaching surgery. However, in many instances, student-operated devices 74 will be owned by medical students 72 and may be, for example, smartphones, tablet computers, or wearable devices. Prior to the illustrated teaching surgery, a student commentary capture application 76 has been loaded onto each student-operated device 74 (generally corresponding to applications 38 shown in FIG. 2). When executed by the OS of each device 74, student commentary capture application 76 may be utilized to gather student commentary data 78 and, in certain instances, to capture video feeds 80 for submission to video process device 12 (FIG. 1).

A number of dedicated video input sources 82 (generally corresponding to client device 32 in FIG. 1) may be utilized to capture the teaching surgery. As indicated in FIG. 3, video input sources 82 may include a number external cameras 84 positioned around the Operating Room (OR) in which the teaching surgery is performed; e.g., cameras 84 may be mounted to different locations along the room and upper walls of the OR to avoid interfering with the movement of the medical personnel. This is further schematically illustrated in FIG. 3 by the presence of additional cameras 84' positioned around the depicted OR. Additionally or alternatively, one or more of cameras 84 may be worn by a surgeon or mounted to movable arm, which suspended above patent 70 and can be manually or remotely manipulated. Dedicated video input sources 82 may also include other specialized types of imagery input sources 86. For example, and as previously noted, such sources can include imagery captured of patient 70 not visible to an ordinary human observer, such as infrared imagery or heat maps indicative of blood flow within a region of the patient's body. In certain instances, images representative of electrical brain activity may be recorded and presented. As yet another example, alternative video sources 86 may include miniaturized cameras of the type inserted into the body of patient 70 during a particular type of surgery or imaging procedure, such as laparoscopic surgery. Relatedly, real-time machine read-outs or other sensor data may be captured and provided to video processing device 12 (FIG. 1) for incorporation into the annotated raw video, as described below. Regardless of the number and type of imaging devices serving as video input sources 82, the output of such devices is provided to video processing device 12 for usage in generating the annotated raw video, as indicated in FIG. 3 by arrow 88. Additionally, and as indicated by arrow 90, the video feeds captured by input sources 82 may also be streamed to student-operated devices 74 for viewing utilizing application 76.

The functionality and GUI of student commentary capture application 76, and therefore the "look and feel" of application 76, will vary amongst embodiments. However, to provide an example of application 76 in an embodiment, additional reference will be made to FIG. 4 in conjunction with FIG. 3 in the following description. Referring jointly to these drawing figures, FIG. 4 sets-forth a screenshot 92 generated by one of student-operated devices 74 (here, a smartphone) when executing student commentary capture application 76. Specifically, a GUI is presented on a display screen 94 of device 74, along with a live feed or streamed image 96 of the educational presentation. As indicated above, streamed image 96 may be captured by dedicated video input sources 82 and made available to student-operated devices 74, whether by direct transmission from input sources 82 to devices 74 or, more likely, by transmission of the streaming video feeds from sources 82, through video processing device 12, and to devices 74. In certain cases, student commentary capture application 76 may also permit the students to actively switch between video streams of the teaching surgery by, for example, touching or otherwise selecting a virtual button 98.

As previously indicated, in certain embodiments, real-time sensor data may also be displayed via student commentary capture application 76. As an example, an ECG readout 99 has further been incorporated into display imagery 94 presented on student-operated device 74 shown in FIG. 4. Various other types of sensor data, whether describing patient vital sign information or other information pertaining to the presentation at hand, can be incorporated into the imagery presented to the students via devices 74 in other embodiments. Additionally, such sensor or machine read-out data can be also be captured and displayed in final video products described herein, as synchronized in time with the presentation to provide a real-time awareness of such sensor data in relation to the other imagery captured in the class discussion video.

Figure 4:
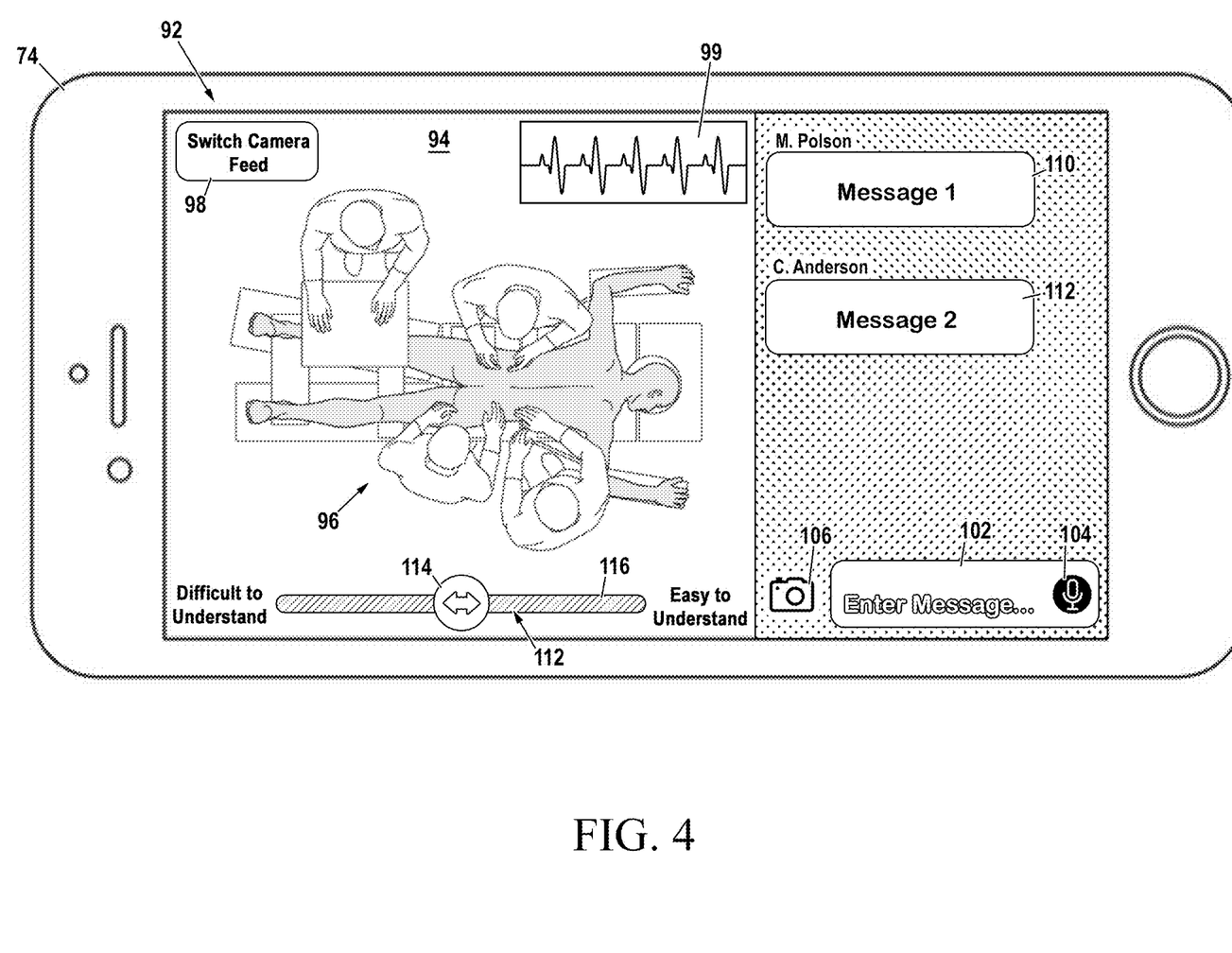
FIG. 4 is a screenshot of a student commentary capture application executed on a student-operated device, such as a smartphone, as depicted in accordance with a further exemplary embodiment of the present disclosure.

As a particular student observes the teaching surgery, whether by viewing the surgery from the gallery, on display screen 94 of device 74, or a combination thereof, the medical student can submit questions, suggestions, and other commentary as desired. Again, this is indicated in FIG. 3 by box 78, as well as by arrow 100. The student commentary may be received in a variety of different formats, as permitted by application 76. For example, as indicated in FIG. 4, a text field 102 may be provided on display screen 94 of device 74, which can be selected by a student user and then utilized to enter typed messages; e.g., touch selection of field 102 may summon a virtual keyboard and allow entry of typed messages in a manner similar to text message functionalities implemented in the well-known manner. Furthermore, selection of icon 104 (e.g., a virtual button) may enable verbal entry of text message via voice-to-text conversion or recording of audio clips, which may then be submitted to video processing device 12 as student commentary data. Similarly, selection of icon 106 may enable a video clip or digital image to be captured utilizing student-operated device 74 and then submitted in conjunction with the student commentary data. Thus, in certain instances and as previously described, a student operating device 74 can capture video clips of the educational presentation and submit such video clips to video processing device 12 for usage in generating the raw commentary-containing video output at STEP 62 of method 54 (FIG. 2). Finally, as indicated in FIG. 4 by graphics 108, 110, other student commentary messages may be presented via the GUI of application 76, if desired.

In certain embodiments, student commentary capture application 76 may also prompt a student operating device 74 for feedback indicating a self-reported understanding level. An example of such a prompt is shown in FIG. 4 as a sliding scale graphic 112 including a slider marker 114, which can be moved by touch-and-drag input along a sliding scale 116. As labeled, movement of slider marker 114 to the left in FIG. 4 indicates that the student viewer finds a particular portion of the educational presentation difficult to understand or unclear. Conversely, movement of slider marker 114 to the right in FIG. 4 indicates that the student viewer finds a particular portion of the educational presentation easy to understand or readily comprehendible. Thus, by gathering such student input data, and then reporting such data to video processing device 12, an indication can be generated on the raw commentary-containing containing video of the level of student understanding during various intervals of the education presentation. In this manner, if one or more students report that a particular segment of the education presentation is unclear or difficult to understand, post-production explanatory content can be added to aid in understanding this segment of the presentation.

Finally, as indicated in FIG. 3 at boxes 118, 120, video processing device 12 utilizes the live feeds of the educational presentation (here, the teaching surgery) captured by dedicated video input sources 82 and, perhaps, by student-operated devices 74 to generate a digital video recording of the educational presentation. Again, selection of video inputs provided by such video input sources may be controlled, in real-time, utilizing control device 16 (FIG. 1).

Additionally, student commentary may be presented in the resulting raw commentary-containing video at the appropriate timepoints; that is, such that the student commentary is synchronized with the video content to appear at the actual time during the educational presentation at which each student commentary item was generated or submitted to video processing device 12. Afterwards, as represented by box 120, the professor performing the surgery, other faculty members, or registered students can then view the recording and introduce post-production content to generate a finalized version of the classroom discussion video. Such post-production content can include commentary or other annotations, such as audio or textual explanations addressing the questions submitted by the students. Finally, as indicated in FIG. 3 by cloud symbol 122, the final version of the annotated class discussion video may be uploaded to the cloud or otherwise made accessible to intended viewers. If desired, and as indicated by graphic 124, the annotated class discussion video may be availed to a wider community of researchers/students across the world in real-time and for on-demand viewing.

There has thus been provided multiple exemplary embodiments of video production systems and methods for generating annotated class discussion videos, which contain real-time student commentary, post-production annotations responsive to student commentary, and combinations thereof. Embodiments of the video production system include a video processing device, which receives wireless input signals from multiple student-operated devices during a particular teaching lesson or educational presentation. As a subsequent juncture, the video processing device generates a preliminary or raw commentary-containing video including a visual recordation of the educational presentation as constructed from the dedicated video feeds and, perhaps, from additional video feeds captured by one or more of the students utilizing the student-operated devices. An instructor then views the raw commentary-containing video and utilizes the video processing device to modify the video to include content responsive to the student commentary. The post-production content is combined with the raw commentary-containing video, which may remain in its original form or may be modified in some manner (e.g., by the removal or editing of selected student commentary), to yield an collaboratively-enhanced, annotated class discussion video, which may then be made available for viewing.

In at least some instances, the annotated class discussion video may be availed to a larger (e.g., worldwide) community, which can further edit, pose questions related to, and otherwise interact with the class discussion video to create, in effect, a community-edited, Internet-accessible educational resource similar to an online community-edited encyclopedia page or entry. In such instances, the annotated class discussion video may further be aggregated with a number of other annotated class discussion video to create an online repository of annotated, community-edited videos on various educational topics.

In the above-described manner, the class-discussion video can provide an effective teaching tool, which enables instances of student confusion or incomprehension to be addressed without interruption of the presentation. Further, embodiments of the present disclosure can be advantageously utilized to aid in educating remotely-located students who may not otherwise have physical access to local facilities required or useful in learning, such as a local laboratory utilized in teaching chemistry, physics, biology, mechanical engineering, or the like. Additionally, when multiple cameras are positioned around a presentation area and then utilized to produce the raw commentary-containing video or the annotated class discussion video, a remotely-located student may still view the presentation at multiple angles (and, perhaps, view 360° video content). Concurrently, utilizing the systems and methods described above, such a remotely-located student can still effectively interact with an instructor despite a physical separation of, for example, hundreds, thousands, or tens of thousands of miles between the remotely-located student and the instructor.

The term "exemplary" is used herein to represent one example, instance or illustration that may have any number of alternates. Any implementation described herein as "exemplary" should not necessarily be construed as preferred or advantageous over other implementations. While several exemplary embodiments have been presented in the foregoing detailed description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents. Finally, numerical identifiers, such as "first" and "second," have been utilized in the foregoing Detailed Description to reflect an order of introduction of similar elements or features in at least some instances. Such numerical identifiers may also be utilized in the subsequent Claims to reflect the order of introduction therein. As the order of introduction of such elements or features may vary between the Detailed Description and the Claims, the usage of such numerical identifiers may also vary accordingly.

What is claimed is:

1. A method carried-out by a video post-production system that comprises a video processing device and a display device to produce added content responsive to student commentary, the method comprising:
   receiving, at the video processing device, a first video input stream from a first dedicated video input source capturing an educational presentation;
   further receiving, at the video processing device, student commentary data received from a plurality of student-operated devices during the educational presentation;
   utilizing at least the first video input stream to produce a raw commentary—containing video of the educational presentation containing synchronized student commentary derived from the student commentary data;
   adding post-production content responsive to the student commentary responsive to a derived synchronized student commentary wherein the post-production content comprises input that addresses the student commentary;
   outputting a finalized annotated class discussion video containing the post-production content for viewing on the display device;
   adding textual replies and annunciation responsive to the student commentary to appear in the finalized annotated class discussion video; and
   superimposing over imagery of the educational presentation for appearance on the display device to present the student commentary and a responsive post-production content.

2. The method of claim 1, further comprising:
   in conjunction with receiving the first video input stream at the video processing device, concurrently receiving a second video input stream from a second dedicated video input source capturing the educational presentation; and combining selected portions of the first video input stream with selected portions of the second video input stream when producing the finalized annotated class discussion video of the educational presentation.

3. The method of claim 1, further comprising:

adding post-production content by reviewing the raw commentary-containing video of the educational presentation and incorporating by a video processing device's responsive content addressing the student commentary.

4. The method of claim 3, further comprising:

disseminating the finalized annotated class discussion video to a larger community for further collaborative editing; and permitting further iterative versions of the finalized annotated class discussion video by supplemental added layering post-production content created by a knowledgeable individual within a larger viewing audience.

5. The method of claim 4, further comprising:

enabling an instructor to retroactively answer questions while enabling an instructor's replies to appear concomitantly with the student commentary upon viewing of the finalized annotated class discussion video.

6. The method of claim 1, further comprising:

receiving the student commentary data, at least in part, as drawn images superimposed over a live feed, the images at least comprising an arrow, circle, and similar identifying images of an object appearing in a video feed to which submitted student commentary pertains and executed by the student-operated devices.

7. The method of claim 1, wherein the student commentary is synchronized to appear in the raw commentary-containing video at appropriate timepoints during the educational presentation at which the student commentary was created or received by video processing device.

8. The method of claim 1, further comprising:

condensing redundant and similar student commentary into a single comment.

9. A video post-production system utilized in conjunction with a display device and a video processing device, the video post-production system comprising:

a controller configured to receive a first video input stream from a dedicated video input source during an educational presentation;

a wireless receiver coupled to the controller and configured to provide thereto student commentary data received from a plurality of student-operated devices during the educational presentation; and a memory storing computer-readable instructions that, when executed by the controller, cause the video post-production system to:

utilize at least the first video input stream to produce a raw commentary—containing video of the educational presentation containing synchronized student commentary derived from the student commentary data;

add post-production content responsive to the student commentary responsive to a derived synchronized student commentary wherein the post-added production content comprises input that addresses the student commentary, and output a finalized annotated class discussion video containing the post-production content for viewing on the display device;

add textual replies and annunciation responsive to the student commentary to appear in the finalized annotated class discussion video: and superimpose over imagery of the educational presentation for appearance on the display device to present the student commentary and a responsive post-production content.

10. The video post-production system of claim 9 wherein the computer-readable instructions, when executed by the controller, further cause the video post-production system to:

in conjunction with receiving the first video input stream at the video processing device, concurrently receive a second video input stream from a second dedicated video input source capturing the educational presentation; and combine selected portions of the first video input stream with selected portions of the second video input stream when producing the finalized annotated class discussion video of the educational presentation.

11. The video post-production system of claim 9 wherein the computer-readable instructions, when executed by the controller, further cause the video post-production system to:

add post-production content by reviewing the raw commentary-containing video of the educational presentation and incorporating by a video processing device's responsive content addressing the student commentary.

12. The video post-production system of claim 9 wherein the computer-readable instructions, when executed by the controller, further cause the video post-production system to:

disseminate the finalized annotated class discussion video to a larger community for further collaborative editing; and permit further iterative versions of the finalized annotated class discussion video by supplemental added layered post-production content created by a knowledgeable individual within a larger viewing audience.

13. The video post-production system of claim 12 wherein the computer-readable instructions, when executed by the controller, further cause the video post-production system to:

enable an instructor to retroactively answer questions while enabling an instructor's replies to appear concomitantly with the student commentary upon viewing of the finalized annotated class discussion video.

14. The video post-production system of claim 13 wherein the computer-readable instructions, when executed by the controller, further cause the video post-production system to:

receive the student commentary data, at least in part, as drawn images superimposed over a live feed, the images at least comprising an arrow, circle, and similar identifying images of an object appearing in a video feed to which submitted student commentary pertains and executed by the student-operated devices.

15. The video post-production system of claim 14 wherein the student commentary is synchronized to appear in the raw commentary-containing video at appropriate timepoints during the educational presentation at which the student commentary was created and received.

16. The video post-production system of claim 9 wherein the computer-readable instructions, when executed by the controller, further cause the video post-production system to:

condense redundant and similar student commentary into a single comment receive additional video input feeds of the educational presentation from the student-operated devices.

17. A method carried-out by a video post-production system that comprises a video processing device and a display device to produce added content responsive to student commentary, the method comprising:

receiving, at the video processing device, a first video input stream from a first dedicated video input source capturing an educational presentation;

further receiving, at the video processing device, student commentary data received from a plurality of student-operated devices during the educational presentation;

utilizing at least the first video input stream to produce a raw commentary—containing video of the educational presentation containing synchronized student commentary derived from the student commentary data;

adding post-production content responsive to the student commentary responsive to a derived synchronized student commentary wherein the post-production content comprises input that addresses the student commentary;

outputting a finalized annotated class discussion video containing the post-production content for viewing on the display device; and receiving the student commentary data, at least in part, as drawn images superimposed over a live feed, the images at least comprising an arrow, circle, and similar identifying images of an object appearing in a video feed to which submitted student commentary pertains and executed by the student-operated devices.

18. The method of claim 17, further comprising:

in conjunction with receiving the first video input stream at the video processing device, concurrently receiving a second video input stream from a second dedicated video input source capturing the educational presentation; and combining selected portions of the first video input stream with selected portions of the second video input stream when producing the finalized annotated class discussion video of the educational presentation.

19. The method of claim 17, further comprising: adding post-production content by reviewing the raw commentary—containing video of the educational presentation and incorporating by a video processing device's responsive content addressing the student commentary.

20. The method of claim 17, further comprising: adding textual replies and annunciation responsive to the student commentary to appear in the finalized annotated class discussion video.

* * * * *